(12) United States Patent
Carty et al.

(10) Patent No.: US 7,048,795 B1
(45) Date of Patent: May 23, 2006

(54) BONDING OF CEMENT PASTE TO PORCELAIN SHAPED ARTICLES THROUGH THE USE OF CERAMIC GLAZES

(76) Inventors: William M. Carty, 1482 Waterwells Rd., Alfred Station, NY (US) 14803; Michael Q. Sheppard, PO 1749, Homer, AK (US) 96903

( * ) Notice: Subject to any disclaimer, the term of this patent is extended or adjusted under 35 U.S.C. 154(b) by 0 days.

(21) Appl. No.: 11/191,107

(22) Filed: Jul. 27, 2005

(51) Int. Cl.
*C04B 14/00* (2006.01)
*C04B 14/22* (2006.01)

(52) U.S. Cl. ............... 106/814; 106/713; 106/737; 428/404

(58) Field of Classification Search ........... 106/712, 106/737, 814; 428/404
See application file for complete search history.

(56) References Cited

U.S. PATENT DOCUMENTS

| | | | |
|---|---|---|---|
| 2,198,861 A | 4/1940 | Chamberlain et al. | |
| 2,331,357 A * | 10/1943 | Swenson | 428/221 |
| 2,408,164 A | 9/1946 | Foster et al. | |
| 2,699,409 A * | 1/1955 | Hashimoto | 428/404 |
| 3,078,516 A | 2/1963 | Trammell, Jr. et al. | |
| 3,198,656 A * | 8/1965 | Harlan | 428/404 |
| 3,613,166 A | 10/1971 | Wallace | |
| 3,846,085 A | 11/1974 | Dunn, Jr | |
| 3,975,132 A | 8/1976 | Keim | |
| 4,128,369 A | 12/1978 | Kemerer et al. | |
| 4,238,179 A | 12/1980 | Llabres et al. | |
| 4,261,706 A | 4/1981 | Blanding | |
| 4,370,390 A | 1/1983 | Burk | |
| 4,400,421 A | 8/1983 | Stover | |
| 4,588,443 A | 5/1986 | Bache | |
| 4,605,443 A | 8/1986 | MacDowell | |
| 4,873,810 A | 10/1989 | Lecaroz | |
| 4,913,910 A | 4/1990 | McCarville et al. | |
| 4,965,138 A | 10/1990 | Gonzalez | |
| 5,081,081 A | 1/1992 | Fothergill | |
| 5,091,765 A | 2/1992 | Yoshinaka et al. | |
| 5,110,652 A | 5/1992 | Allaire et al. | |
| 5,124,287 A | 6/1992 | Wehrenberg | |
| 5,154,561 A | 10/1992 | Lee | |
| 5,155,071 A | 10/1992 | Jacobson | |
| 5,169,566 A | 12/1992 | Stucky et al. | |
| 5,213,591 A | 5/1993 | Celikkaya et al. | |
| 5,346,422 A | 9/1994 | Bagrudia et al. | |
| 5,433,777 A * | 7/1995 | Sheppard | 106/400 |

* cited by examiner

*Primary Examiner*—David Brunsman
(74) *Attorney, Agent, or Firm*—C. John Brannon; Bingham McHale LLP

(57) ABSTRACT

A method for increasing the strength of concrete, including applying a coating of high- silica glaze to porcelain aggregate pieces, dispersing the glaze-coated porcelain aggregate pieces in a Portland cement matrix, bonding the high-silica glaze to the porcelain aggregate pieces, bonding the high-silica glaze to the Portland cement matrix, and curing the Portland cement matrix to yield high-strength concrete. The high-silica glaze further include silica and flux. The molar ratio of silica to flux is at least about 5 to 1 and the flux further comprises RO and $R_2O$. The molar ratio of RO to $R_2O$ is at least about 7 to 3. RO is selected from the group including CaO, SrO, BaO, ZnO, FeO, PbO and their combinations and $R_2O$ is selected from the group including $Li_2O$, $Na_2O$, $K_2O$, and their combinations.

18 Claims, 6 Drawing Sheets

BONDING OF CEMENT PASTE TO PORCELAIN SHAPED ARTICLES THROUGH THE USE OF CERAMIC GLAZES

TECHNICAL FIELD OF THE INVENTION

The present invention relates generally to the field of ceramic compositions, and, more specifically, to the bonding of cementitious materials to porcelain bodies.

BACKGROUND OF THE INVENTION

Figure 1:
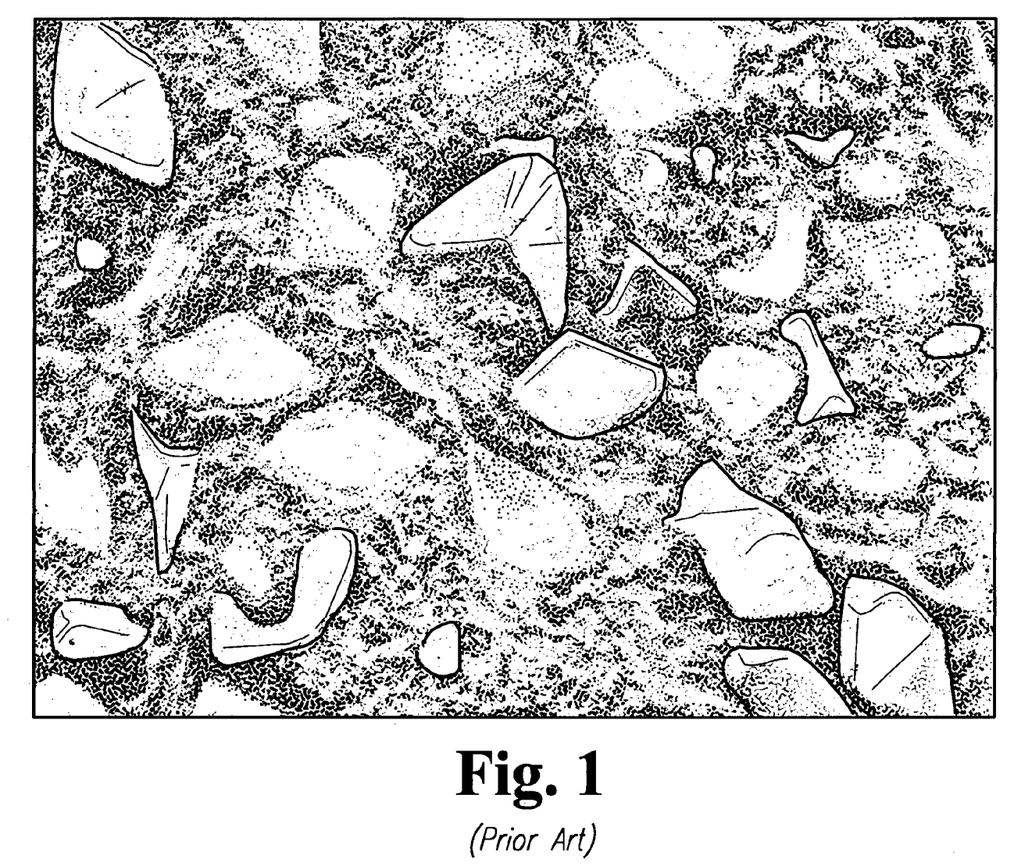
FIG. 1 is a photomicrograph of a first fracture surface in a concrete having a porcelain aggregate phase dispersed in a Portland cement matrix, wherein the fracture surface favors the aggregate-matrix interface.
Figure 2:
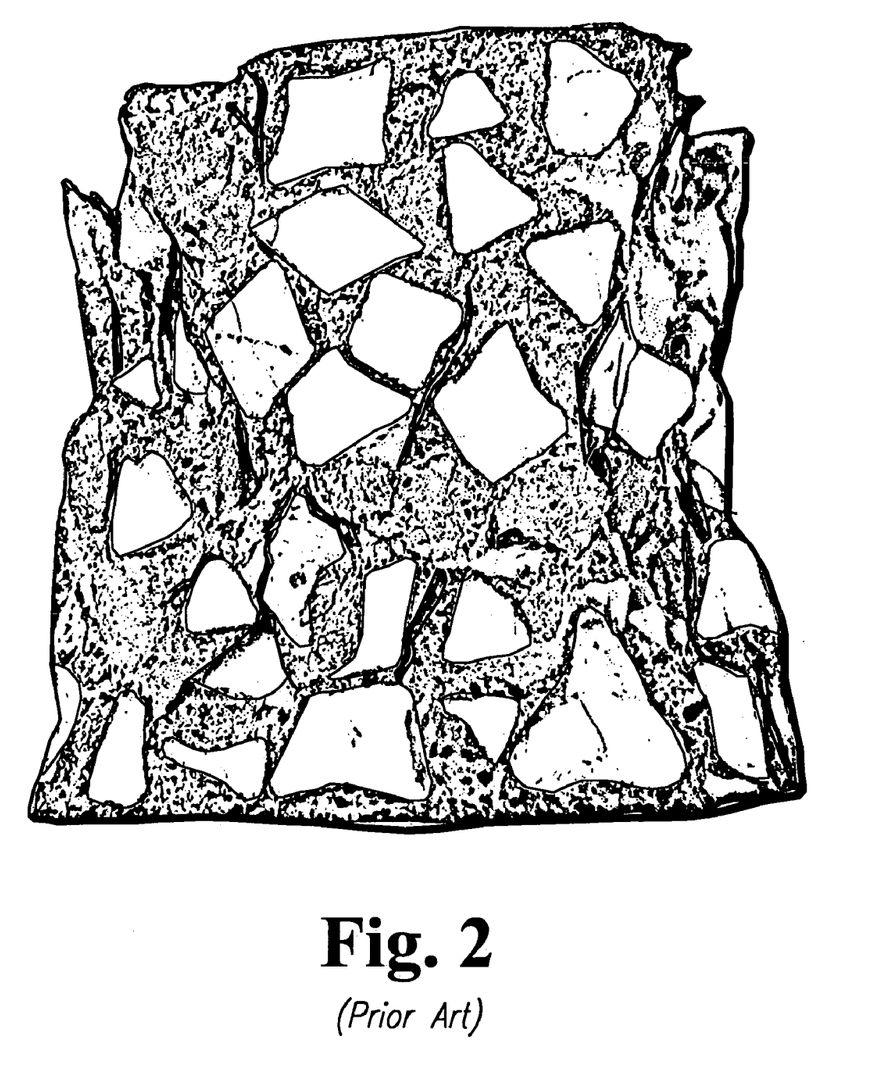
FIG. 2 is a photomicrograph of a second fracture surface in a concrete having a porcelain aggregate phase dispersed in a Portland cement matrix, wherein the fracture surface favors the aggregate-matrix interface.

It is widely accepted that the strength of conventional concrete is strongly coupled to the strength of the aggregate material included therein. Ultimately, the strength of conventional concrete is limited by the strength of the aggregate, so opportunities to enhance the strength of concrete are rooted in the development of high-strength aggregate. Recent progress in aggregate development, hinging in part on the development of shaped aggregate, indicates that high-strength porcelain offers a unique opportunity for the development of high-strength concrete. However, as shown in FIGS. 1 and 2, preliminary testing of concretes including a dispersed high- strength porcelain aggregate phase in a Portland cement matrix indicated that the fracture path strongly favored the interface between the aggregate and the cement paste, signaling that better bonding of the cement paste to the aggregate would assist in the efficient transfer of the aggregate strength to the concrete composite. Thus, to better utilize porcelain as concrete aggregate, there remains a need for providing a better bond between the porcelain aggregate material and the cementitious matrix. The present invention addresses this need.

SUMMARY OF THE INVENTION

The present invention relates to improving the bonding of Portland cement to a whiteware/porcelain body through the use of a highly siliceous matte glaze to improve the bonding of the shaped article/unit cells to the cement paste allowing the shaped article strength to increase bond strength for concrete and other cement matrix composite applications. One object of the present invention is to provide an improved concrete material. Related objects and advantages of the present invention will be apparent from the following description.

DETAILED DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The present invention relates to concretes enjoying a glaze-assisted cement-aggregate bond with increased strength, and a method for making the same. In particular, the method is useful for increasing the strength of the bond between the cementitious matrix and the dispersed porcelain aggregate phase therein; the invention is particularly useful in enhancing the bond between a Portland cement matrix and a dispersed shaped porcelain aggregate phase to thus enhance the strength of the concrete.

Overview

Ceramic glazes offer an opportunity to establish a microscopically roughened surface that may enhance mechanical bonding. Further, through careful control of the chemistry of the glaze, chemical bonding of the cement paste to the high-strength aggregate may be promoted. A strong chemical-mechanical bond offers the most efficient route for transferring the mechanical strength attributes of the aggregate to the concrete composite.

To demonstrate the effect of enhancing the bonding between cement paste and porcelain aggregate via the use of a glaze on the porcelain aggregate, a series of test glazes were developed that systematically altered the surface texture and chemistry of the glazed aggregate. It was demonstrated that gloss glazes provided the smoothest surface for enhanced mechanical bonding and thus bonded the least well to the cement matrix. Matte glazes that were high in alumina and low in silica bonded only slightly better to the cement matrix; but matte glazes high in calcium and silica (and therefore low in alumina and alkali) bonded strongly to the cement matrix. These high calcium—high silica glazes typically exhibit a craggy, rough surface providing both high surface area (for chemical interactions) and sufficient roughness to promote mechanical bonding. While data suggests that the contributions from the chemical bonding mechanism dominate those of the mechanical bonding mechanism, it is clear that the combination of chemical and mechanical enhances the bond between the cementitious matrix and the porcelain aggregate phase, greatly increasing the strength of the concrete.

By enhancing the bonding between the cement matrix and the high-strength aggregate, the strength of the concrete is enhanced, thus providing a comparatively inexpensive method for producing high-strength concrete. This approach allows for the bonding of the cement matrix to a high-strength aggregate to be specifically manipulated to allow greater or lesser bonding, thus allowing the properties of the cement to be precisely controlled. In other words, by controlling the cement-aggregate interfacial strength, the strength or toughness of the concrete can be fine- tuned to fit the requirements of a specific application.

While the description and embodiments herein focus on porcelain aggregate dispersed in a Portland cement matrix with a high-silica interfacial glaze layer therebetween, other aggregate compositions coated with glaze layers of other compositions and dispersed in matrices of other compositions are likewise contemplated; the scope of the invention is not necessarily limited to porcelain aggregate dispersed in Portland cement.

Aggregate Considerations

Figure 3:
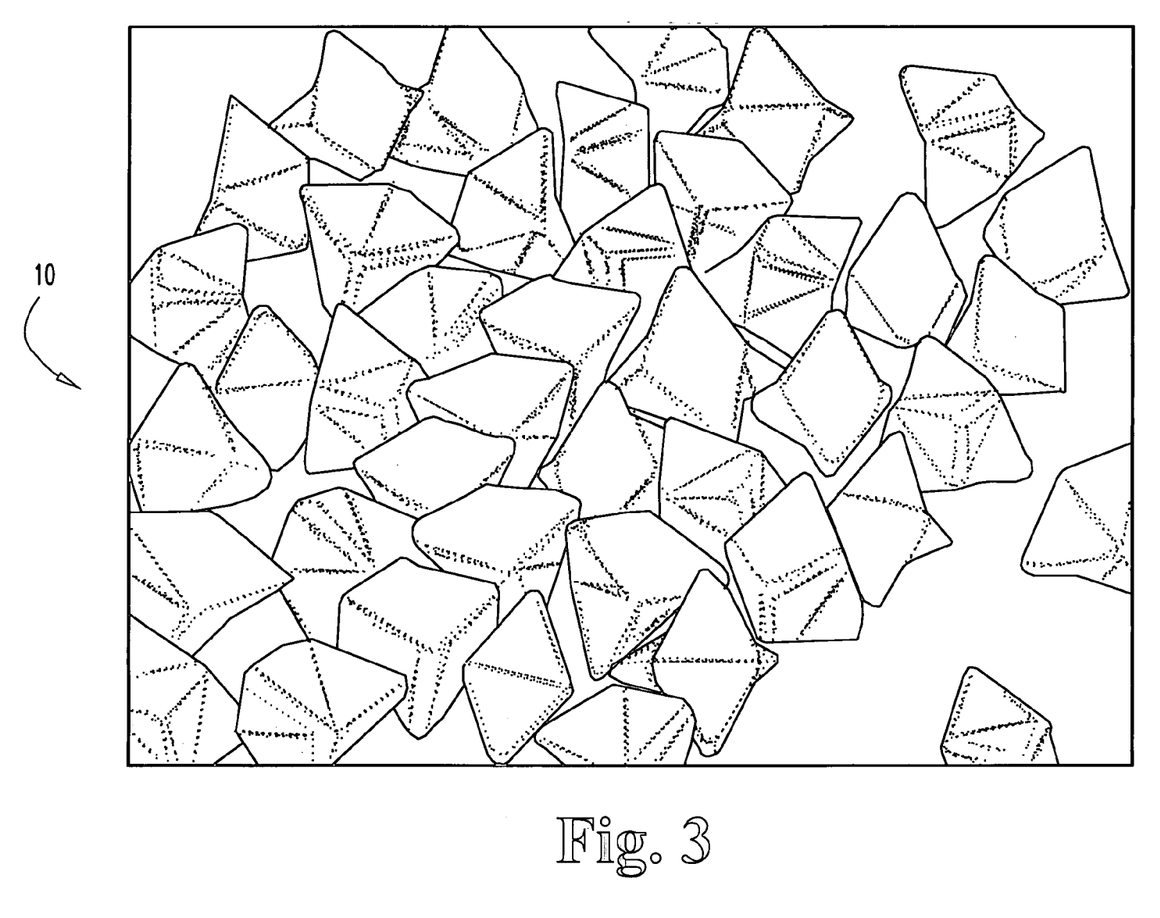
FIG. 3 is a perspective view of a plurality of like-shaped aggregate bodies.

As seen in FIG. 3, the aggregate typically defines porcelain pieces or bodies 10. The bodies 10 are typically of like size, although they may be of different sizes and may be described by any convenient size distribution curve. The bodies 10 are typically composed of porcelain. A typical porcelain composition is about 36% clay (composed of a mixture of kaolin and ball clay), about 13 weight percent alumina, about 29 weight percent quartz, and about 22 weight percent nepheline syenite; however, the aggregate may be composed of any convenient porcelain composition or range of compositions.

While the aggregate bodies 10 may have any convenient shape(s), the aggregate bodies 10 typically have similar shapes, more typically have substantially the same shape, and still more typically have specific geometric shapes, such as that of the tetrajack. A tetrajack is a three dimensional shape that may be described as a base tetrahedron (the base) with coincident tetrahedra joining its four faces. The tetrajack shape offers the advantage of having one of the highest know packing densities.

While the aggregate bodies 10 may be glaze coated in their green state, sintering or bisque firing the green bodies makes them less fragile and less prone to deformation during handling prior to firing. For example, the green bodies may be heated at a rate of approximately 1.5 degrees Celsius per minute to a temperature of 1260° C. and then allowed to soak or dwell at temperature (1260° C.) for 3 hours. After the soak, the bodies 10 are cooled substantially to room temperature at a rate of 1.5 degrees Celsius per minute. Typically, the bodies 10 are bisque fired to a temperature of at least about 1150 degrees Celsius, and more typically to at least about 1250 degrees Celsius with a soak of at least about 2 hours.

Aggregate Preparation

The glaze, in either a fritted or raw form, is applied to the aggregate bodies 10 using conventional means (i.e., spraying, dipping, or via a waterfall technique) to provide a thin (typically less than about 200 μm and more typically about 50 μm) coating after firing. Typically, the aggregate is calcined (i.e., low temperature bisqued) prior to glazing to promote a stronger bond between the aggregate and the glaze, although green (unfired) and fully vitrified porcelain can also be glazed using this approach.

A relatively thin glaze coating is typically applied to reduce the tendency of failure occurring within the glaze layer and also to improve the transfer of stress to the aggregate. The glaze is matured by firing at elevated temperature, the level of which is dictated by the maturation temperature of the porcelain body. Typical temperatures range from about 1150° C. to about 1320° C., although other temperatures are possible. Overfiring of the aggregate may impair the strength and may also promote the formation of a glossy surface, thus reducing the effectiveness of the glaze coating as a means of improving the bonding between the cementious matrix phase and the high-strength aggregate phase.

Composition Considerations

Flux ratio: Analysis of ceramic glazes used by industry and artists indicate that the ratio of alkali oxides and the RO oxides is 0.3:0.7 ($R_2O$:RO), but can range from 0.2:0.8 to 0.4:0.6 in industrial glazes. $Li_2O$, $Na_2O$, and $K_2O$ are collectively referred to as the alkali (i.e., $R_2O$) oxides, but in most glazes are typically an unspecified blend of $Na_2O$ and $K_2O$. The RO oxides are typically referred to as the alkaline earth oxides of MgO, CaO, SrO, and BaO, FeO, but also including ZnO and PbO. Trials of these glazes at the 0.3:0.7 level indicates that these glazes typically do not bond strongly to the cement paste, and that bonding occurs most readily when the ratio of $R_2O$:RO is less than 0.25:0.75; bonding most readily occurs when the ration of $R_2O$:RO is about 0.1:0.9. Further decreases in the relative amount of alkali ($R_2O$) typically does not enhance the bonding between the cement phase and the porcelain aggregate phase.

$Al_2O_3$: Furthermore, the ratio of alumina ($Al_2O_3$) to the sum of the fluxes ($R_2O$+RO, on a molar ratio basis is always equivalent to unity, or 1.0) is typically held at the 0.3 level or below, and more typically alumina is present at a level of 0.2 moles to mole of flux. Typical $Al_2O_3$ levels in industrial glazes range from 0.3 to 0.6 and the specific ratio is usually dictated by the intended industrial application and the glaze esthetic. Increasing the alumina level typically increases the glaze durability in commercial industrial glazes, but in this application, higher alumina levels tend to limit the degree of the chemical bonding of the cement paste to the glaze coating.

$SiO_2$: A higher silica level in the glaze typically promotes chemical bonding between he glaze and the cement paste. This is believed to be due to the general deficiency of silica in the Portland cement system, and the saturation of the liquid phase in the cement paste with calcium. Cement pastes are saturated with calcium during the reaction phase due to the dissolution (of Portland cement) and the precipitation (of the hydrated cement phase) mechanisms in the cement paste reactions, so the availability of additional silica is beneficial. Having a surface that is high in silica, as is present in the high-silica matte glazes, promotes chemical bonding between the cement paste and the porcelain aggregate. In addition, high silica glazes, particularly those that are low in alkali ($R_2O$) tend to have strong matte surfaces, and when observed in a scanning electron microscope, the matte character is manifest as a rough, craggy surface (as illustrated in FIG. 3). The molar ratio of $SiO_2$ to flux ($R_2O$+RO) is typically at least 5:1 but can be as high as 9:1. If the silica level is too high, the glaze will not react sufficiently with the porcelain aggregate to bond strongly thus limiting the benefits associated with promoting a cement-glaze reaction.

$B_2O_3$: If $B_2O_3$ is added to the glaze, the molar ratio to the fluxes should also be low, below 0.3. Excessive boron will soften the glaze and reduce the glaze viscosity at high temperature, but does not enhance bonding between the cement paste and the porcelain aggregate.

Typical compositions: Two typical compositions for a glaze that enhances the bonding between the cement paste and a high-strength porcelain aggregate, represented on a molar ratio basis are 0.1 $R_2O$, 0.9 CaO; 0.20 $Al_2O_3$, and 6.0 $SiO_2$ (Glaze 21A in Table 1) and 0.1 $R_2O$, 0.9 CaO; 0.20 $Al_2O_3$, and 7.0 $SiO_2$ (Glaze 26A in Table 1).

(When represented on a molar percentage basis, these glazes are composed of 1.39% $R_2O$, 12.50% RO, 2.78% $Al_2O_3$, and 83.33% $SiO_2$ (Glaze 21A) and 1.22% $R_2O$, 10.98% RO, 2.44% $Al_2O_3$, and 85.37% $SiO_2$ (Glaze 26A), respectively.)

Table 1 below lists several high-silica glaze compositions.

TABLE 1

| Glaze Designation | Unity Molecular Formula or Molar Ratio Basis | | | |
|---|---|---|---|---|
| | $K_2O + Na_2O$ | $CaO + MgO$ | $SiO_2$ | $Al_2O_3$ |
| 21 | 0.3 | 0.7 | 6.0 | 0.20 |
| 22 | 0.3 | 0.7 | 6.0 | 0.28 |
| 26 | 0.3 | 0.7 | 7.0 | 0.20 |
| 27 | 0.3 | 0.7 | 7.0 | 0.28 |
| 29 | 0.3 | 0.7 | 8.0 | 0.20 |
| 30 | 0.3 | 0.7 | 8.0 | 0.28 |
| 32 | 0.3 | 0.7 | 9.0 | 0.20 |
| 33 | 0.3 | 0.7 | 9.0 | 0.28 |
| 21a | 0.1 | 0.9 | 6.0 | 0.20 |
| 22a | 0.1 | 0.9 | 6.0 | 0.27 |
| 26a | 0.1 | 0.9 | 7.0 | 0.20 |
| 27a | 0.1 | 0.9 | 7.0 | 0.28 |
| 29a | 0.1 | 0.9 | 8.0 | 0.20 |
| 30a | 0.1 | 0.9 | 8.0 | 0.28 |
| 32a | 0.1 | 0.9 | 9.0 | 0.20 |
| 33a | 0.1 | 0.9 | 9.0 | 0.27 |
| 21-1 | 0.3 | 0.7 | 5.33 | 0.20 |
| 21-2 | 0.3 | 0.7 | 5.33 | 0.17 |
| 21-3 | 0.3 | 0.7 | 4.66 | 0.20 |
| 21-4 | 0.3 | 0.7 | 4.66 | 0.16 |
| 21-5 | 0.3 | 0.7 | 4.0 | 0.20 |
| 21-6 | 0.3 | 0.7 | 4.0 | 0.13 |

Bond Formation

Figure 4:
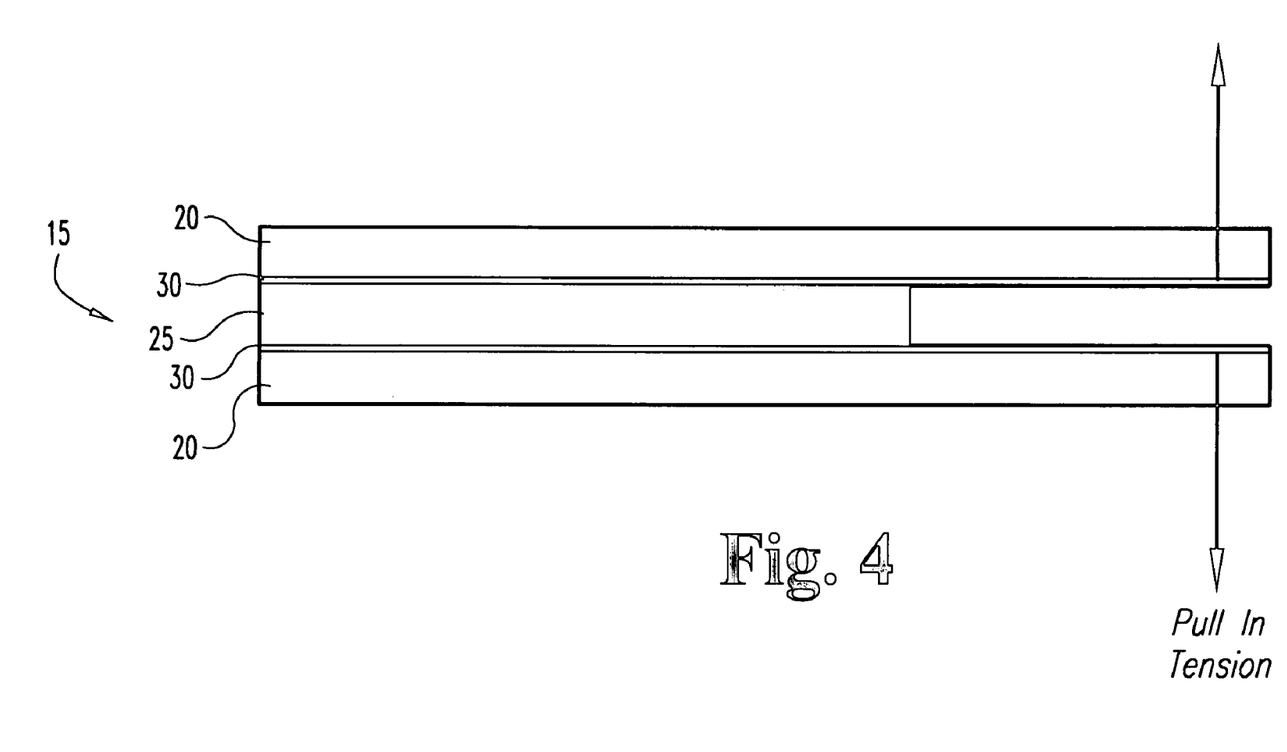
FIG. 4 is a schematic view of a porcelain-high silica glaze-Portland cement bond.
Figure 5:
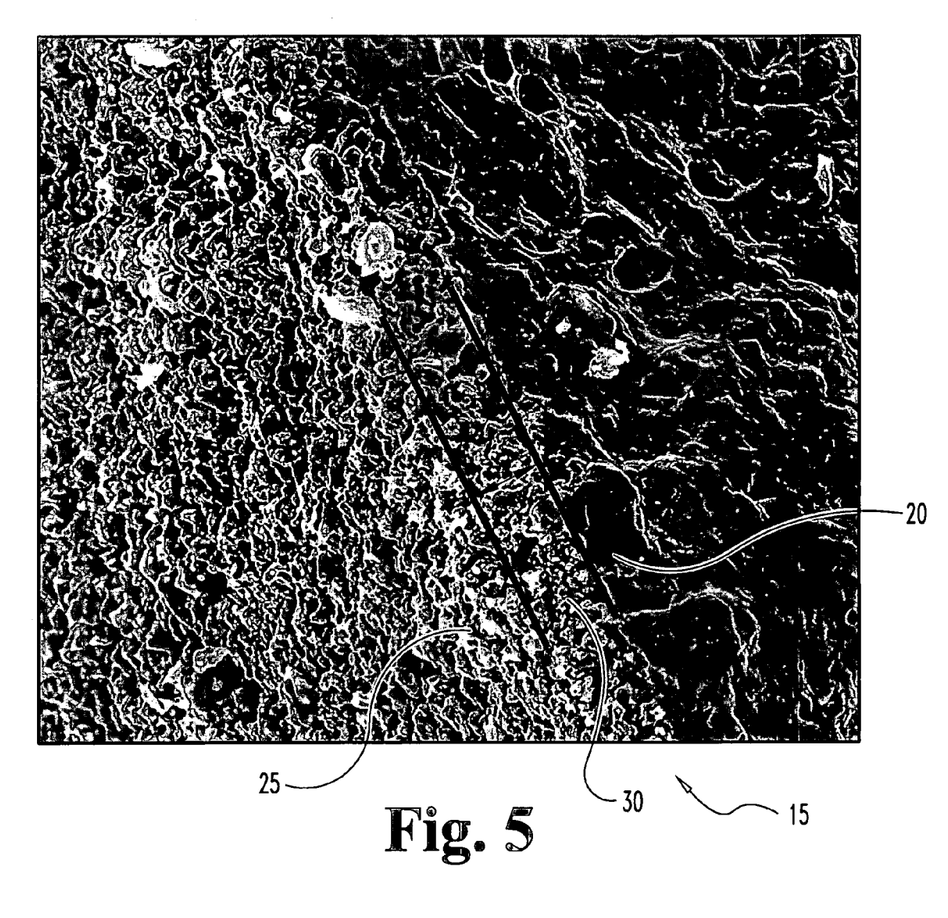
FIG. 5 is a SEM photomicrograph of the bond of FIG. 4.

As shown in FIGS. 4 and 5, a high-strength bond 15 is produced between the aggregate material and the cementitious matrix by first identifying a first porcelain surface 20 and a cementitious second surface 25 to be bonded together and then treating the first porcelain surface 20 by glazing a bonding layer 30 thereto. The first porcelain surface 20 is prepared for bonding in the cementitious matrix by firing the first porcelain surface 20 to a temperature of at least about 1150 degrees Celsius to bond the glaze layer 30 thereto. The prepared first porcelain surface 20 and the cementitious second surface 25 are then chemically joined in the bonding layer 30 to produce a bond 15. Typically for porcelain aggregate bonded in a Portland cement matrix, bonding layer 30 is a glaze having the general formula of (0.1 $R_2O$, 0.9 RO) 6.0 $SiO_2$, with $R_2O$ typically selected from the group consisting of $Li_2O$, $Na_2O$, $K_2O$, and their combinations and RO typically selected from the group consisting of CaO, SrO, BaO, ZnO, FeO, PbO and their combinations.

EXAMPLES

Example 1

Green porcelain aggregate 10 was glazed via dipping. Glaze suspensions of 30, 35, and 40 weight percent solids (with the remained being water) were tested for dipping. Green aggregate was sufficiently wetted by dipping into glaze suspensions to cause a significant portion of the green aggregate bodies 10 to lose their shape. The dipped green aggregate bodies 10 also absorbed sufficient glaze to result in a thick coating sufficient to effectively bring the aggregate closer to spherical shape. The coated green bodies 10 were fired to a soak temperature of about 1150 degrees Celsius and held at temperature for 4 hours.

Example 2

Green porcelain aggregate was sprayed with aqueous suspensions of 30, 35, and 40 weight percent solid. The aggregate was placed in a strainer and then sprayed. The aggregate were tumbled in the strainer while being sprayed to maximize the homogeneity of the coating. The coated green bodies were fired to a soak temperature of about 1250 degrees Celsius and held at temperature for 2 hours.

Example 3

Bisqued aggregate was glazed (both by dipping and by spraying) with aqueous suspensions of 35 and 40 weight percent solid with 2, 3 and 4 weight percent additions of polyethylene glycol and/or carboxy methylcellulose (to thicken the glaze for increased adherence to the bisqued aggregate). Dipping quantities of aggregate in glaze resulted in adherence of individual aggregate pieces to one another, which would give rise to the aggregate fusing together during firing. Sprayed aggregate had more uniform and thin glaze coatings and did not adhere to one another. The coated bisqued bodies were fired to a soak temperature of about 1200 degrees Celsius and held at temperature for 3 hours.

Example 4

Predetermined amounts of aggregate were tumbled with predetermined amounts of glaze suspension (of composition 21-2) such that the glaze was sufficient to coat the aggregate without giving rise to adhesion of aggregate pieces. 6.2 kg of porcelain aggregate was tumbled with 220 grams of 35 weight percent glaze compositions 21-2 (with 2 weight percent CMC thickener) for one minute in a 5 gallon vessel. The glazed aggregate was then removed from the vessel and air dried. The glazed bodies 10 were fired to 1200° C. for 3 hours.

Firing

Glazes 21–33 and 21a–33a were fired at various temperatures ranging from 1245° C. to 1315° C. The ramp rate in these firings was 300° C. per hour with a hold at peak temperature for 3 hours.

Glaze 21 and glazes 21-1 through 21-6 were fired at various temperatures from 1050° C. to 1250° C. The ramp rate in these firings was approximately 150° C. per hour with a hold at peak temperature for 45 minutes.

In operation, a high-strength Portland-cement based concrete 40 is produced by first applying a coating of high-silica glaze to (typically porcelain) aggregate pieces 10 and then firing the porcelain aggregate pieces 10 to bond the high-silica glaze layer 30 thereto, typically to a temperature of at least about 1150 degrees Celsius. (See FIG. 6). The glaze-coated porcelain aggregate pieces 10 are dispersed in a Portland cement matrix 45, where the high-silica glaze layer 30 is bonded to the Portland cement matrix 45. Finally, the Portland cement matrix 45 is cured to yield high-strength concrete 40. As noted above, the high-silica glaze layer 30 typically is substantially comprised of silica and flux, with a typical molar ratio of silica to flux of at least about 5 to 1. The flux typically has a composition of RO and $R_2O$, wherein the molar ratio of RO to $R_2O$ is typically at least about 7 to 3, and is more typically about 9 to 1. RO is typically selected from the group including CaO, SrO, BaO, ZnO, FeO, PbO and their combinations and $R_2O$ is typically selected from the group including $Li_2O$, $Na_2O$, $K_2O$, and their combinations. Alumina may be added to the composition, typically in an amount such that the molar ratio of flux to alumina is about 5:1.

Figure 6:
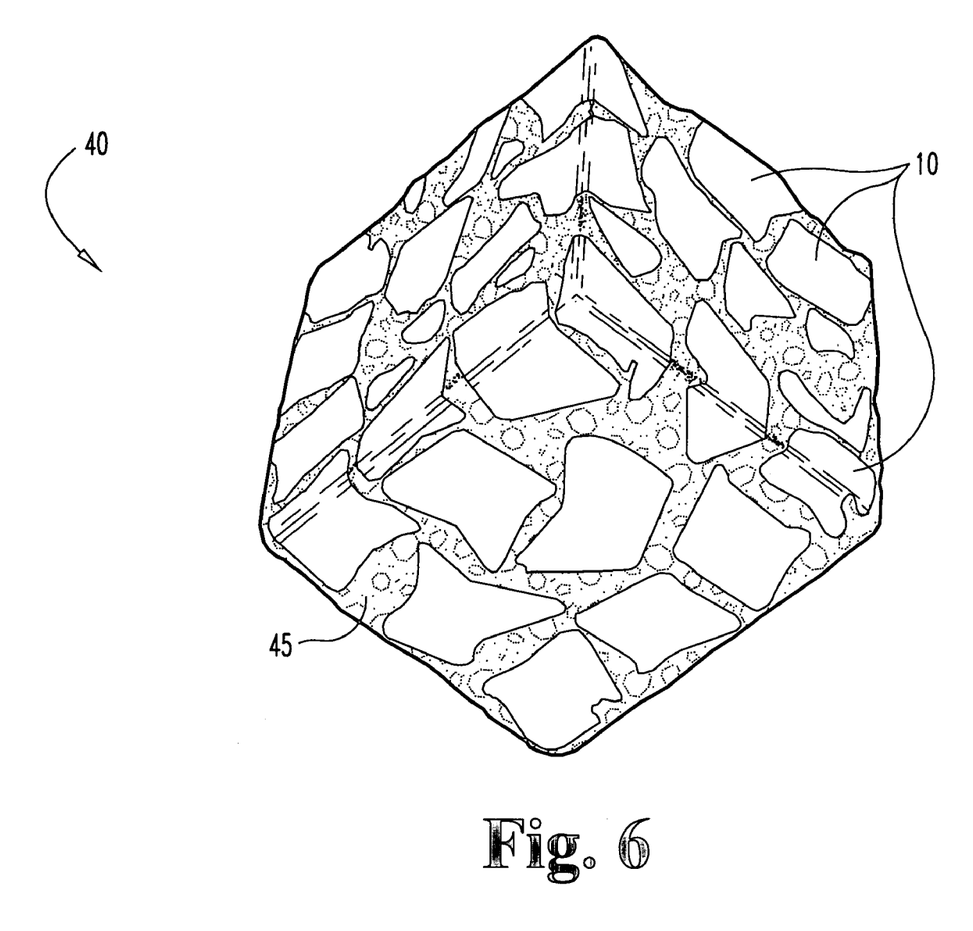
FIG. 6 is a perspective view of a concrete body having porcelain aggregate pieces bonded into a Portland cement matrix via a high-silica intermediary bonding layer.

Typically, the aggregate pieces 10 are all substantially the same size; however, the aggregate pieces 10 may be characterized by any convenient size distribution curve. More typically, the aggregate pieces 10 all have the same or similar shapes, and more typically the aggregate pieces 10 have the shape of a tetrajack.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

The invention claimed is:

1. A method for strengthening concrete, comprising:
   a) applying a coating of reactive glaze to aggregate pieces;
   b) dispersing the glaze-coated aggregate pieces in a cementitious matrix;
   c) bonding the glaze to the aggregate pieces;
   d) bonding the glaze to the cementitious matrix; and
   e) curing the cementitious matrix to yield concrete;
   wherein the glaze both chemically and mechanically bonds to the cementitious matrix;
   wherein the glaze is substantially silica and flux; and
   wherein the molar ratio of silica to flux is at least about 5 to 1.

2. The method of claim 1 wherein the aggregate pieces are porcelain; wherein the cementitious matrix is Portland cement; and wherein the glaze is substantially silica and flux and wherein the molar ratio of silica to flux is at least about 9 to 1.

3. The method of claim 2 wherein the flux is substantially calcia.

4. The method of claim 3 wherein the flux is about 90 percent calcia and about 10 percent $R_2O$ and wherein R is chosen from the group including lithium, sodium and potassium.

5. The method of claim 1 wherein the glaze coating is about 50 microns thick.

6. The method of claim 1 wherein the glaze coating is less than about 250 microns thick.

7. The method of claim 1 wherein the glaze is bonded to the aggregate pieces by firing the coated aggregate pieces to a temperature of at least about 1150 degrees Celsius.

8. A strengthened concrete comprising:
   an aggregate phase;
   a cementitious matrix phase; and
   a glaze phase bonded between the aggregate phase and the cementitious matrix phase;
   wherein the aggregate phase defines a plurality of aggregate pieces dispersed in the cementitious matrix phase;
   wherein the aggregate phase is porcelain;
   wherein the cementitious matrix phase is Portland cement;
   wherein the glaze phase is substantially silica and flux; and
   wherein the molar ratio of silica to flux is at least about 5 to 1.

9. The concrete of claim 8 wherein the flux further includes calcia and $R_2O$; wherein the flux is about 90 mole percent calcia and about 10 mole percent $R_2O$; and
   wherein R is selected from the group including lithium, sodium and potassium.

10. The concrete of claim 9 wherein the flux further includes calcia and $R_2O$; wherein the flux is about 70 mole percent calcia and about 30 mole percent $R_2O$; and wherein R is selected from the group including lithium, sodium and potassium.

11. The concrete of claim 8 wherein the aggregate phase is porcelain; wherein the cementitious matrix phase is Portland cement; wherein the glaze phase is substantially silica, alumina and flux; wherein the molar ratio of silica to flux is at least about 5 to 1 and wherein the molar ratio of flux to alumina is about 5:1.

12. The concrete of claim 8 wherein the aggregate pieces are all substantially the same size and wherein the aggregate pieces substantially all have the shape of a tetrajack.

13. A method for increasing the strength of concrete, comprising:
   a) applying a coating of high-silica glaze to porcelain aggregate pieces;
   b) dispersing the glaze-coated porcelain aggregate pieces in a Portland cement matrix;
   c) firing the porcelain aggregate pieces to bond the high-silica glaze thereto;
   d) bonding the high-silica glaze to the Portland cement matrix; and
   e) curing the Portland cement matrix to yield high-strength concrete;
   wherein the high-silica glaze further comprises silica and flux;
   wherein the molar ratio of silica to flux is at least about 5 to 1;
   wherein the flux further comprises RO and $R_2O$;
   wherein the molar ratio of RO to $R_2O$ is at least about 7 to 3;
   wherein RO is selected from the group including CaO, SrO, BaO, ZnO, FeO, PbO and their combinations; and
   wherein $R_2O$ is selected from the group including $Li_2O$, $Na_2O$, $K_2O$, and their combinations.

14. The method of claim 13 wherein the glaze is substantially silica, alumina and flux and wherein the molar ratio of flux to alumina is about 5:1.

15. The method of claim 13 wherein the aggregate pieces are all substantially the same size and wherein the aggregate pieces substantially all have the shape of a tetrajack.

16. The method of claim 13 wherein the glaze-coated porcelain pieces are fired to a temperature of at least about 1150 degrees Celsius to bond the high-silica glaze thereto.

17. A high-strength concrete, comprising:
   a porcelain aggregate phase;
   a Portland cement matrix phase; and
   a high-silica glaze phase bonded between the porcelain aggregate phase and the Portland cement matrix phase;
   wherein the porcelain aggregate phase defines a plurality of porcelain pieces dispersed in the Portland cement matrix phase;
   wherein the high-silica glaze phase further comprises silica and flux;
   wherein the molar ratio of silica to flux is at least about 5 to 1;
   wherein the flux further comprises RO and $R_2O$;

wherein the molar ratio of RO to $R_2O$ is at least about 7 to 3;

wherein RO is selected from the group including CaO, SrO, BaO, ZnO, FeO, PbO and their combinations;

wherein $R_2O$ is selected from the group including $Li_2O$, $Na_2O$, $K_2O$, and their combinations;

wherein the aggregate pieces are all substantially the same size; and wherein the aggregate pieces substantially all have the shape of a tetrajack.

18. A method of producing a high-strength cement-aggregate bond, comprising:
 a) identifying a first porcelain surface and a cementitious second surface to be bonded together;
 b) treating the first porcelain surface by glazing a bonding layer thereto;
 c) preparing the first porcelain surface for bonding by firing the first porcelain surface to a temperature of at least about 1150 degrees Celsius; and
 d) joining the prepared first porcelain surface and the cementitious second surface chemically in the bonding layer;

wherein the bonding layer is a glaze having the general formula of $(0.1\ R_2O,\ 0.9\ RO).6.0\ SiO_2$;

wherein $R_2O$ is selected from the group consisting of $Li_2O$, $Na_2O$, $K_2O$, and their combinations; and wherein RO is selected from the group consisting of CaO, SrO, BaO, ZnO, FeO, PbO and their combinations.

\* \* \* \* \*